: # (12) United States Patent
Vollmann

(10) Patent No.: US 7,181,045 B2
(45) Date of Patent: Feb. 20, 2007

(54) METHOD AND DEVICE FOR READING THE ADDRESSES OF ITEMS OF MAIL

(75) Inventor: Klaus Vollmann, Constance (DE)

(73) Assignee: Siemens AG, München (DE)

( * ) Notice: Subject to any disclaimer, the term of this patent is extended or adjusted under 35 U.S.C. 154(b) by 81 days.

(21) Appl. No.: 11/062,845

(22) Filed: Feb. 23, 2005

(65) Prior Publication Data

US 2005/0196014 A1 Sep. 8, 2005

Related U.S. Application Data

(63) Continuation of application No. PCT/DE03/02798, filed on Aug. 21, 2003.

(30) Foreign Application Priority Data

Sep. 3, 2002 (DE) ................. 102 40 470

(51) Int. Cl.
*G06K 9/00* (2006.01)
*G06K 9/20* (2006.01)
*G06K 9/70* (2006.01)

(52) U.S. Cl. .............. 382/101; 382/189; 382/226; 382/321

(58) Field of Classification Search .............. 382/101, 382/102, 189, 321, 226, 229, 231
See application file for complete search history.

(56) References Cited

U.S. PATENT DOCUMENTS 4,632,252 A * 12/1986 Haruki et al. ............... 209/546

5,311,999 A * 5/1994 Malow et al. ............... 209/583
5,538,138 A * 7/1996 Reich .......................... 209/3.3
5,770,841 A * 6/1998 Moed et al. ................. 235/375
6,292,709 B1 * 9/2001 Uhl et al. .................... 700/226

(Continued)

FOREIGN PATENT DOCUMENTS

DE 19531392 1/1997

(Continued)

OTHER PUBLICATIONS

Derwent Abstract—EP-0975442; Sorting method for postal items has automatic address reading system combined with video coding method used for address information which cannot be evaluated by address reading system.

(Continued)

*Primary Examiner*—Andrew W. Johns
*Assistant Examiner*—Anthony Mackowey
(74) *Attorney, Agent, or Firm*—Siemens AG

(57) ABSTRACT

The invention relates to a method and a device for reading the addresses of mailings with an OCR device and a video coding device. On an ambiguous reading result from the OCR device an extract is automatically generated with specified extraction rules from address alternatives as a partial result of the OCR process and the number of concurrent or non-concurrent extracts determined. When the number of the address alternatives does not exceed a maximum value, an extraction coding with the specified extraction rules is carried out with predominantly or only different extracts and a selection coding, for the address alternatives transmitted to the video coding device with the image, is carried out with predominantly or only the same extracts.

6 Claims, 2 Drawing Sheets

U.S. PATENT DOCUMENTS

| | | | |
|---|---|---|---|
| 6,577,749 B1* | 6/2003 | Rosenbaum | 382/101 |
| 6,587,572 B1* | 7/2003 | Suchenwirth-Bauersachs et al. | 382/101 |
| 6,741,724 B1* | 5/2004 | Bruce et al. | 382/101 |
| 6,909,789 B1* | 6/2005 | Hansel et al. | 382/101 |
| 6,993,155 B1* | 1/2006 | Schafer et al. | 382/101 |
| 7,031,519 B2* | 4/2006 | Elmenhurst | 382/181 |
| 2002/0168090 A1* | 11/2002 | Bruce et al. | 382/101 |
| 2003/0012407 A1* | 1/2003 | Rosenbaum et al. | 382/101 |
| 2003/0048925 A1* | 3/2003 | Caillon et al. | 382/101 |
| 2003/0179906 A1* | 9/2003 | Baker et al. | 382/101 |

FOREIGN PATENT DOCUMENTS

| | | |
|---|---|---|
| DE | 19624977 | 2/1998 |
| DE | 19644163 | 5/1998 |
| DE | 10064529 | 1/2002 |
| DE | 10064226 | 7/2002 |
| EP | 0975442 | 9/2001 |
| EP | 1229483 | 8/2002 |
| EP | 1229484 | 8/2002 |
| JP | 08101879 A * | 4/1996 |
| WO | WO97/49503 | 12/1997 |
| WO | WO2004/022253 | 3/2004 |

OTHER PUBLICATIONS

Derwent Abstract—DE-19531392; Handwrtiien character graphical representation system provides contour representation from binary image of handwritten character with projection of contour lines onto fixed axes.

Derwent Abstract—EP-1229484; Method for reading delivery addresses with postcodes with a method for quick and automatic determination of a correct postcode for mail items that have a house and street address that does not agree with the postcode.

Derwent Abstract—DE-10064529; Mail address post code reading method has address scanned in parts when full address cannot be clearly read.

Derwent Abstract—EP-1229483: Method for reading delivery addresses with postcodes with a method for quick and automatic determination of a correct postcode for mail items that have a house and street address that does not agree with the postcode.

Derwent Abstract—DE-19624977; Sorting method for postal items has automatic address reading system combined with video coding method used for address information which cannot be evaluated by address reading system.

Derwent Abstract—DE-19644163; Method for on-line processing of forwarding mail involves pick-up of mail sides provided with names, addresses and other data and transport of mail into intermediate storage unit.

Derwent Abstract—DE-10064226; Reading postal codes of addresses on postal articles involves video coding images if reading result not positively identified, identifying code down to part of large street or several small streets.

* cited by examiner

METHOD AND DEVICE FOR READING THE ADDRESSES OF ITEMS OF MAIL

CROSS REFERENCE TO RELATED APPLICATIONS

The present application is a continuation of international application PCT/DE2003/002798, filed Aug. 21, 2003, which designated the United States, and further claims priority to German application 10240470.4, filed Sep. 3, 2002, the both of which are herein incorporated by reference.

BACKGROUND OF THE INVENTION

The present invention relates to a method and a device for reading the addresses of items of mail.

Systems for the automatic reading of addresses (OCR) are well known in the field of letter processing and are described, for example, in DE 195 31 392 C1. Using modern OCR mail sorting systems, processing rates of 10 letters per second, that is to say 36,000 letters per hour, and more can be achieved. The recognition and reliability varies sharply with the type of script and the overall quality of the address information applied to the surface of the letters, however. In the case of satisfactory recognition, the relevant item of mail can be provided with a machine-readable barcode. This barcode permits further mechanical processing up to any desired order of sorting. In particular, the use of barcodes permits sorting of the items of mail as far as the sorting level of the postal walk, in which the items of mail are sorted in accordance with the order of their distribution by the deliverer.

Since the recognition rates of the automatic reading systems vary greatly, it is necessary to assist this by means of video coding devices. Here, the video images of the items of mail rejected by the OCR device are coded manually by video coding staff at appropriate video coding stations. In the process, the addresses entered are converted into a sorting code by means of a directory.

In order to increase the coding productivity and/or to permit the indication of all the address elements, that is to say ZIP/PC, street/postbox,addressee/postbox, addressee/company, the following important methods are known:

Extraction Coding

Since, given the online delay times which can be reached in practice, only the ZIP/PC address elements can be entered reliably by the operator, specific key components are entered in extraction coding. Extraction coding is normally based on specifically developed rules, in which a code of fixed length is used as an access key to an address directory. For example, Royal Mail uses an extraction formula which is based on the first three and the last two letters. In this case, special rules have to be learned by the operator by heart, in order to avoid superfluous address information and to take account of specific discriminatory features, such as directions, for example East, West, or categories, for example Street, Lane, Road.

Selection Coding

If there are no unambiguous extracts, in which a plurality of entries in a directory correspond to the extraction code, or if the OCR unit supplies a limited number of address alternatives, then the correct address is selected by the operator in selection coding. Since, in this case, decisions have to be made instead of a simple repetitive keyboard entry, the entry productivity of the operators in selection coding is reduced as compared with extraction coding.

EP 0 975 442 B1 describes a method in which both coding methods are used in the course of the reading process. If the OCR unit is not able to read the address unambiguously during the first read attempt, extraction coding is carried out and a new OCR read attempt is carried out with the extraction result. If it is again unsuccessful and, as a result, there are still several address alternatives, the correct address is then selected during selection coding (variant 1). It is also possible for extraction coding still to have to be carried out instead and, if again no unambiguous result is achieved by this in the OCR unit, for further selection coding to have to be performed (variant 2). The disadvantage in this case is that the sequence of recognition steps is relatively rigidly defined (either variant 1 or variant 2 and in this case specifically for all items of mail). However, depending on the address of the respective item of mail, sometimes variant 1 is more efficient and sometimes variant 2. Variant 2 is always more efficient when the questionable address or the address element becomes unambiguous as a result of the entry of the extract, since extraction coding (about 2000 items of mail per hour) is faster than selection coding (about 1000 items of mail per hour). Variant 1 is more efficient in those cases when only selection coding has to be carried out instead of extraction and selection coding.

SUMMARY OF THE INVENTION

The invention is based on the object of providing a method and a device for reading the addresses of items of mail by using an OCR device and a video coding device with which the reading process time can be shortened.

In this case, in the event of an ambiguous read result from the OCR device in each case an extract is generated automatically by agreed extraction rules from address alternatives as a partial result from the OCR process, and the number of extracts which agree or disagree is determined. Next, in the case of predominantly or only different extracts, extraction coding is carried out with the agreed extraction rules by means of the video coding device and, in the case of predominantly or only identical extracts, selection coding is carried out next for the address alternatives transmitted to the video coding device with the image, if the number of address alternatives does not exceed a maximum value.

For each letter, the respectively most efficient sequence of processing steps is selected.

In the case of predominantly or only different extracts, extraction coding is selected as the next step, since the probability is high or certain that a selection step is no longer necessary after the extraction coding step. On the other hand, in the case of predominantly or only identical extracts, selection coding is selected as the next step, since the probability is high or it is certain that, following an extraction coding step, a selection step would still be necessary and the extraction step would be unnecessary effort.

For example, it is advantageous if the maximum value of the number of address alternatives at which selection coding is carried out after the automatic reading is 10. This permits very fast entry with the numeric keypad.

It is also advantageous to supply the OCR device with partial address information determined during extraction coding previously carried out after an unsuccessful OCR read operation, in addition to the relevant image. As a result, the search area and therefore the number of possible address alternatives is restricted.

This partial address information is beneficially postcodes, such as zip codes.

BRIEF DESCRIPTION OF THE SEVERAL VIEWS OF THE DRAWINGS

In the following text, the invention will be explained in an exemplary embodiment by using the drawing.

DETAILED DESCRIPTION OF THE INVENTION

Figure 1:
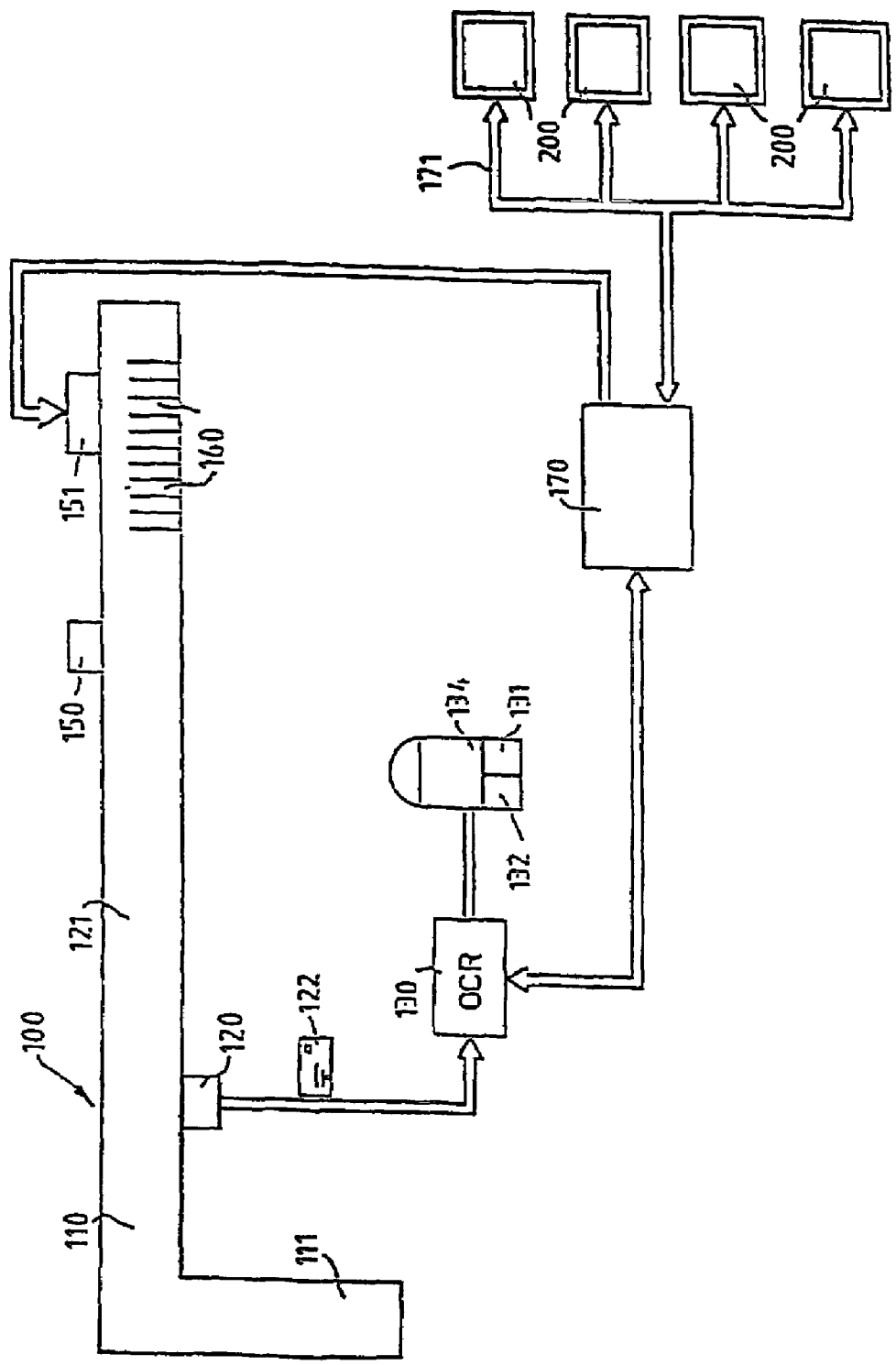
FIG. 1 shows a schematic illustration of a reading device.

FIG. 1 shows a schematic illustration of a mail distribution system with which the method according to the invention can be implemented. An OCR mail sorter 100 comprises a feed device 110, which gradually draws items of mail from a magazine 111 and, at about 10 items of mail per second, transports them to a high resolution device 120 for obtaining images of the items of mail (scanner). The items of mail are then transported in a delay section 121. The items of mail normally have address information on the surface. In an OCR device 130, the address information from the images of the items of mail which have been obtained by the scanner 120 is evaluated. In the event of complete evaluation, a barcode printer 150 is activated and the item of mail is provided with an appropriate barcode for the subsequent sorting into sorting bins 160. The OCR device 130 has one or more microprocessors 131 with associated memory 132, in order to store images of the items of mail. Furthermore, the OCR device 130 has an address directory 134 having postcode/ZIP codes, town names and street names and possibly further address-related information. During the evaluation of the images having address information, a feature-controlled reduction from the input obtained from the address directory is carried out, so that a type of partial dictionary is generated. In individual inputs, plausibilities are assigned, so that during the evaluation a number of items of data are generated from correctly recognized addresses. The device also contains a sequence controller 170 and a number of video coding stations 200, which are connected to the sequence controller 170 directly or via a network 171. If the OCR evaluation of an image was not successful, that is to say complete, this image is transferred from the OCR device 130 to the sequence controller 170, which firstly controls a TID barcode printer 151 and secondly sends the appropriate image to one of the video coding stations 200 which, for example, are subdivided in accordance with coding types such as extraction and selection coding. The TID barcode printer 151 applies an identification code TID to the corresponding item of mail, which makes it possible at a later time to link the address information evaluated with the physical item of mail. In this case, the evaluation of the images takes place off line, although, in principle, given a sufficiently long delay time, online evaluation by means of video coding is also possible. In the latter case, the TID can also be applied to the items of mail at a later time, that is to say if the video coding has not led to a complete evaluation within a specific predetermined time.

In this example, the sequence controller 170 is connected only to one OCR mail sorter 100 with OCR device 130. Of course, coupling to a plurality of OCR mail sorters is also possible.

In order to ensure the sequence during determination of the addresses, in this example the sequence controller 170 is designed in such a way that images with the results of the video coding of the OCR device 130 can be fed to a further automatic address evaluation if the address information has not been evaluated completely during the video coding.

Figure 2:
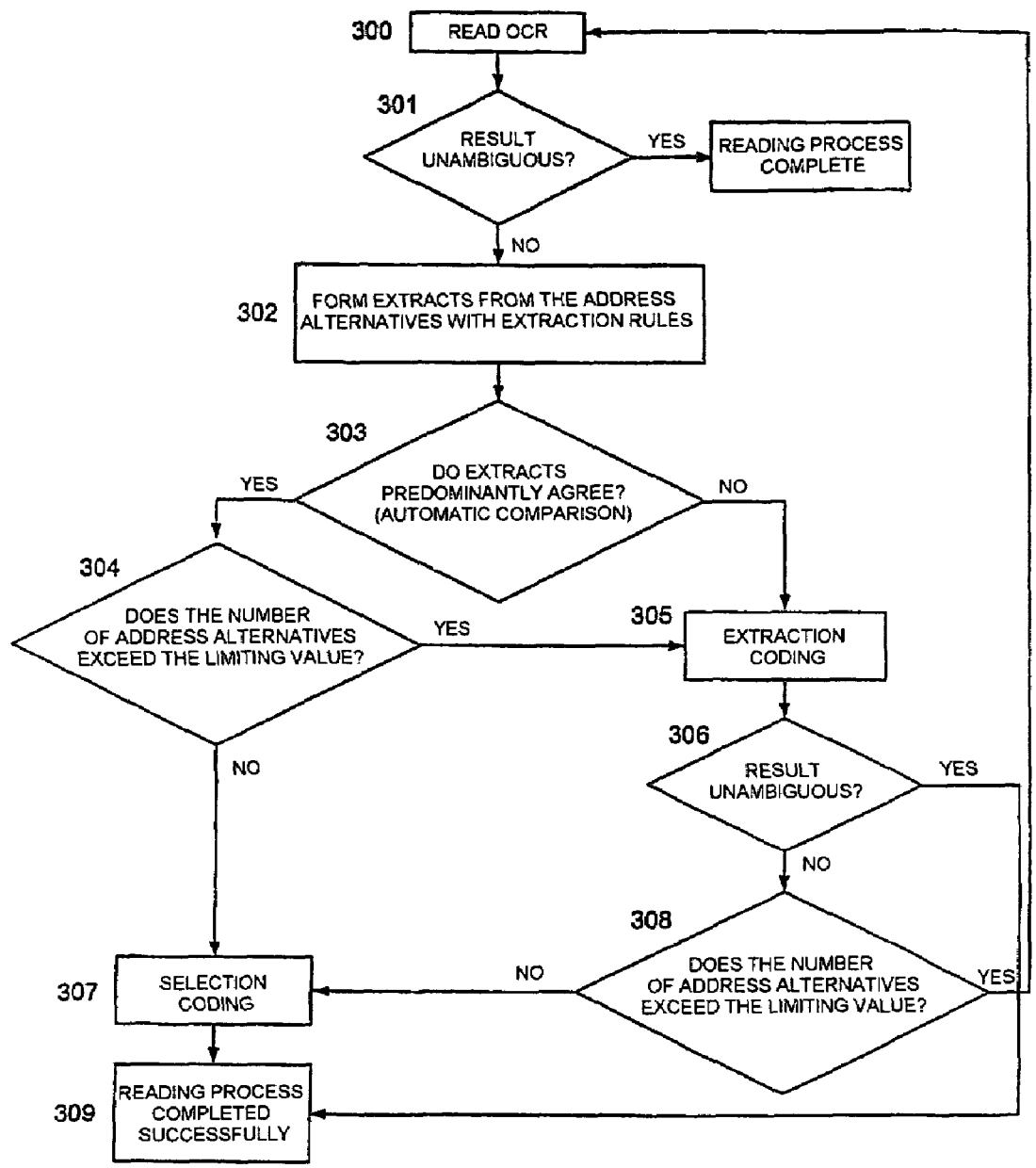
FIG. 2 shows a flow chart of the method sequence.

The sequence of the entire reading process according to the method, which is ensured by the sequence controller 170, is illustrated in FIG. 2.

First of all, in the OCR device 130, a first read attempt 300 is carried out with a transmitted image of an item of mail. After that, a check is made, 301, to see whether the read result is unambiguous. If so, the reading has been completed successfully, if not, in the sequence controller (170) extracts 302 are created from the address alternatives created by the OCR device 130, using the extraction rules defined for extraction coding, and it is determined how many of the extracts agree or disagree 303. In the case of predominantly or only different extracts, extraction coding 305 is carried out, which includes automatically looking through the address database. If the result is unambiguous, the reading process has been completed successfully 309. If this is not the case, a check is made to see whether the number of possible address alternatives exceeds a limiting value. If so, a new OCR read attempt 300 is started with the coding results (the address alternatives), if not, selection coding 307 is carried out, so that the reading process is completed successfully 309. If predominantly or only identical extracts are present and the number of address alternatives does not exceed a defined limiting value 304, selection coding 307 is carried out. If the number of address alternatives lies above the limiting value, extraction coding 305 is carried out. The further sequence is then carried out as described.

The advantage will be explained once more in brief by using a simple address example.

1. Unambiguous Extraction

The item of mail is inserted into the mail sorter 100 and the scanner 120 supplies the image of the letter with the address to the sequence controller 170. The latter passes on the image firstly to the OCR device 130. Since the latter can virtually read the address element needed for sorting (e.g. the street) but not unambiguously, it supplies a selection list with the possible alternatives (for example "Basin Street" and "Mason Street") back to the sequence controller 170. It then checks the alternatives found against the specified extraction rules (for example "the first 4 letters of the street name"). Since the extracts for the alternatives found are different ("Basi" and "Maso"), it is certain that extraction coding will supply an unambiguous result. Since extraction coding is faster than selection coding, the image is therefore then sent to the video coding station 200 for extraction coding. There, the extract is entered by the operator and then sent back to the sequence controller 170. By means of a comparison between the address alternatives created by the OCR device 130 and the extract (e.g. "Basi"), the latter can decide unambiguously that "Basin Street" is on the letter and sends the appropriate sorting information to the mail sorter 100, which then sorts the item of mail accordingly.

2. Ambiguous Extraction

As in the first case, the item of mail is inserted into the mail sorter 100 and the scanner 120 supplies the image of the item of mail with the address to the sequence controller 170. The latter firstly passes on the image to the OCR device 130. Since the latter can virtually read the address element needed for sorting (e.g. the street) but not unambiguously, it supplies a selection list with the possible alternatives (for example "Basin Street" and "Basin Way") back to the sequence controller 170.

It checks the alternatives found against the specified extraction rules (e.g. "the first 4 letters of the street name"). Since the two extracts are identical in this case ("Basi" in each case), an extraction coding step would be of no use here and the sequence controller 170 sends the image to the video coding station 200 for selection coding, where the correct alternative is selected by the operator (e.g. "Basin Street"). This selection is sent back to the sequence controller 170 by the video coding station 200 and the former then passes the appropriate sorting information to the mail sorter 100, which then sorts the item of mail accordingly.

The invention claimed is:

1. A method for reading the addresses of items of mail, an image of the surface of each item of mail having the address information being supplied to an OCR device for automatic evaluation and, in the event of the address information not being recognized unambiguously, the associated image with partial results from the OCR device being passed on to a video coding device having a plurality of video coding stations for video coding, comprising the steps of:
   generating an extract, in the event of an ambiguous read result from the OCR device, by agreed extraction rules, from address alternatives as a partial result from the OCR process, and
   determining a number of extracts which agree or disagree such that:
   in the case of predominantly or only different extracts, performing extraction coding by means of the video coding device with the agreed extraction rules, and
   in the case of predominantly or only identical extracts, performing selection coding for the address alternatives transmitted to the video coding device with the image, if the number of address alternatives does not exceed a maximum value.

2. The method according to claim 1, wherein a maximum value of the number of address alternatives at which selection coding is performed after the automatic reading is 10.

3. The method according to claim 1, further comprising the steps of supplying the OCR device, in addition to a relevant image, partial address information determined during extraction coding previously carried out after an unsuccessful OCR read operation.

4. The method according to claim 3, wherein the partial address information additionally supplied to the OCR device relates to the postcode.

5. A system for reading addresses of items of mail with an automatic address reading system, comprising:
   a device for obtaining images of items of mail and storing them,
   an OCR device for automatic evaluation of images of surfaces of the items of mail having address information, and
   a device for video coding the images of the surfaces of the items of mail containing the address information, the device for video coding comprising a plurality of video coding stations and a sequence controller which distributes the video coding jobs to individual video coding stations, wherein the sequence controller is designed in such a way that:
   in the case of an ambiguous read result from the OCR device, in each case an extract is generated automatically by agreed extraction rules from address alternatives as a partial result from the OCR process, and the number of extracts which agree or disagree is determined,
   in the case of predominantly or only different extracts, the relevant image is passed to one of the video coding stations provided for extraction coding for the purpose of extraction coding with the agreed exaction rules, and
   in the event of predominantly or only identical extracts, the relevant image with the address alternatives from the OCR device is next passed to one of the video coding stations provided for selection coding for the purpose of selection coding, if the number of address alternatives does not exceed a maximum value.

6. The system according to claim 5, wherein the sequence controller is designed in such a way that the OCR device is supplied with partial address information determined during extraction coding previously carried out after an unsuccessful OCR read operation, in addition to the relevant image.

* * * * *